(12) United States Patent
Dressendorfer et al.

(10) Patent No.: US 8,025,165 B2
(45) Date of Patent: Sep. 27, 2011

(54) DOCUMENT STORAGE RACK CONVERSION APPARATUS

(75) Inventors: Michael Dressendorfer, San Dimas, CA (US); Bernard A. Higueroa, Chino Hills, CA (US); Peter Fink, Irvine, CA (US); Bouasry Ott, Anaheim, CA (US)

(73) Assignee: Russ Bassett Corporation, Whittier, CA (US)

( * ) Notice: Subject to any disclaimer, the term of this patent is extended or adjusted under 35 U.S.C. 154(b) by 774 days.

(21) Appl. No.: 12/026,462

(22) Filed: Feb. 5, 2008

(65) Prior Publication Data

US 2009/0194496 A1  Aug. 6, 2009

(51) Int. Cl.
*A47B 43/00* (2006.01)
(52) U.S. Cl. ........................................ 211/191
(58) Field of Classification Search ............... 211/191, 211/151, 183, 189, 187, 103, 106; 108/107, 108/110
See application file for complete search history.

(56) References Cited

U.S. PATENT DOCUMENTS

| | | | | |
|---|---|---|---|---|
| 2,722,318 A * | 11/1955 | Brown | ........................ | 108/143 |
| 3,152,670 A * | 10/1964 | Colligan et al. | ........................ | 403/327 |
| 3,545,626 A * | 12/1970 | Seiz | ........................ | 211/192 |
| 3,626,487 A * | 12/1971 | Seiz | ........................ | 211/192 |
| 3,685,665 A * | 8/1972 | Atwater | ........................ | 211/191 |
| 3,695,456 A * | 10/1972 | Lewis | ........................ | 211/191 |
| 4,155,462 A * | 5/1979 | Bendel | ........................ | 211/151 |
| 4,372,451 A * | 2/1983 | Rasmussen et al. | ........................ | 211/187 |
| 4,790,707 A * | 12/1988 | Magretta et al. | ........................ | 414/276 |
| 4,955,490 A * | 9/1990 | Schafer | ........................ | 211/187 |
| 5,036,778 A * | 8/1991 | Briosi | ........................ | 108/110 |
| 5,115,920 A * | 5/1992 | Tipton et al. | ........................ | 211/59.2 |
| 5,205,630 A * | 4/1993 | Welch et al. | ........................ | 312/249.11 |
| 5,279,431 A * | 1/1994 | Highsmith et al. | ........................ | 211/189 |
| 5,295,591 A * | 3/1994 | Slater | ........................ | 211/59.2 |
| 5,316,157 A * | 5/1994 | Konstant | ........................ | 211/151 |
| 5,474,412 A * | 12/1995 | Pfeiffer et al. | ........................ | 414/276 |
| 5,499,727 A * | 3/1996 | Koch | ........................ | 211/193 |
| 5,680,942 A * | 10/1997 | McAllister et al. | ........................ | 211/162 |
| 5,785,189 A * | 7/1998 | Gollob et al. | ........................ | 211/187 |
| 5,797,502 A * | 8/1998 | Brady et al. | ........................ | 211/183 |
| 5,845,794 A * | 12/1998 | Highsmith | ........................ | 211/189 |
| 6,095,347 A * | 8/2000 | Mauro-Vetter | ........................ | 211/151 |
| 6,102,185 A * | 8/2000 | Neuwirth et al. | ........................ | 193/35 R |
| 6,260,719 B1 * | 7/2001 | Azzopardi et al. | ........................ | 211/189 |
| 6,293,507 B1 * | 9/2001 | Gorniak | ........................ | 248/243 |
| 6,484,893 B1 * | 11/2002 | Tkatch | ........................ | 211/94.02 |
| RE38,517 E * | 5/2004 | Pfeiffer et al. | ........................ | 414/276 |
| 6,776,298 B2 * | 8/2004 | Courtwright | ........................ | 211/191 |
| 7,007,815 B2 * | 3/2006 | Anderson et al. | ........................ | 211/191 |
| 2002/0139766 A1 * | 10/2002 | Courtwright | ........................ | 211/191 |
| 2002/0179555 A1 * | 12/2002 | Pater | ........................ | 211/151 |
| 2004/0155003 A1 * | 8/2004 | Anderson et al. | ........................ | 211/191 |
| 2005/0145147 A1 * | 7/2005 | Costa et al. | ........................ | 108/108 |

\* cited by examiner

*Primary Examiner* — Sarah Purol
(74) *Attorney, Agent, or Firm* — Kenneth L. Green

(57) ABSTRACT

A rack conversion system mounts to an existing storage rack and includes lateral tracks for side to side movement of forward bins and longitudinal tracks for front to rear movement of rear bins. The bins are sized to efficiently store a particular item, for example, paper files. The forward bins are movable side to side along the lateral tracks and reside in front of the rear bin. The rear bins are moveable front to rear along the longitudinal tracks and are normally positioned to the rear to allow the side to side movement of the forward bins. The lateral tracks are preferably mounted below the forward bins and do not interfere with the movement of the rear bins, and the longitudinal tracks are preferably mounted above the rear bins and do not interfere with movement of the forward bins.

17 Claims, 8 Drawing Sheets

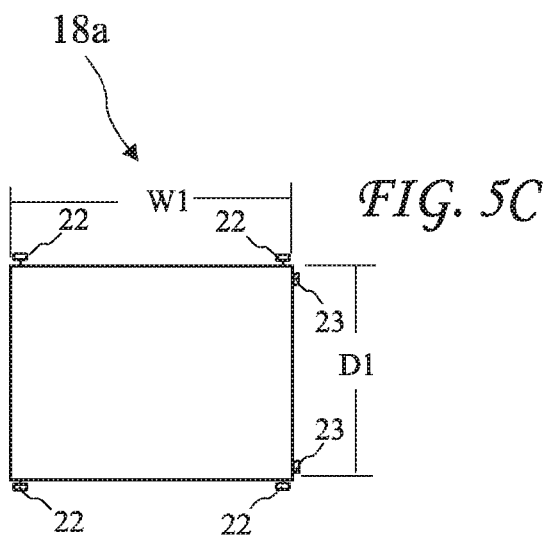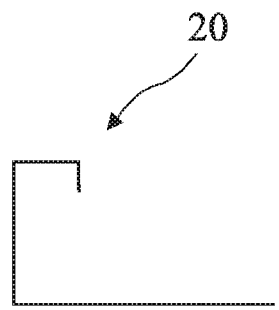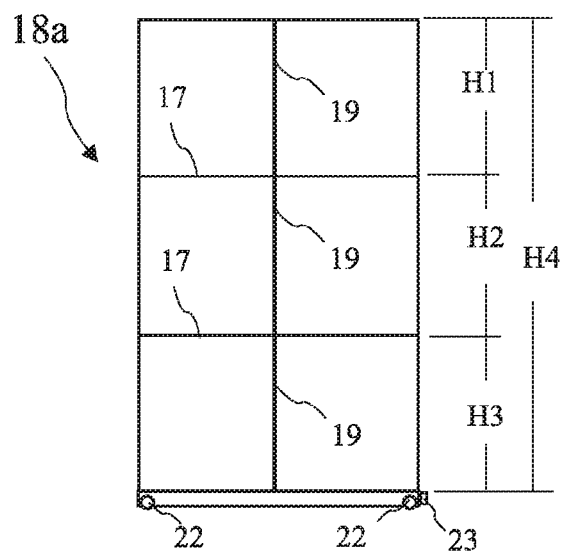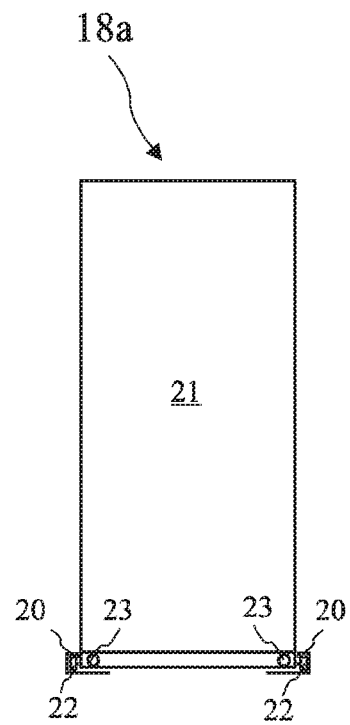
FIG. 5C
FIG. 6
FIG. 5A
FIG. 5B

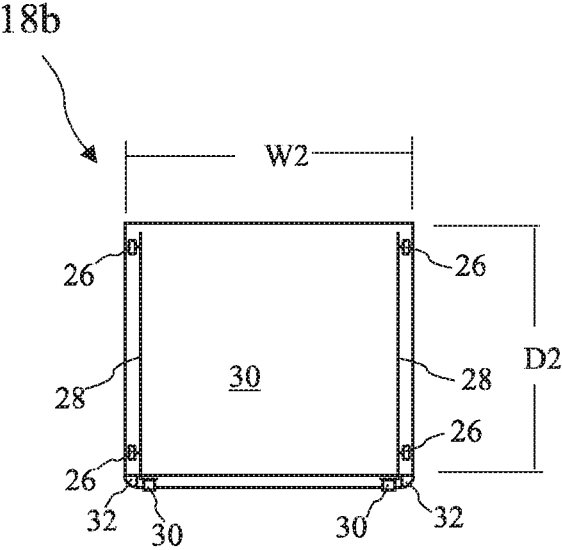
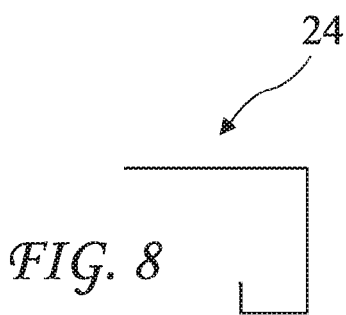
FIG. 7C
FIG. 8
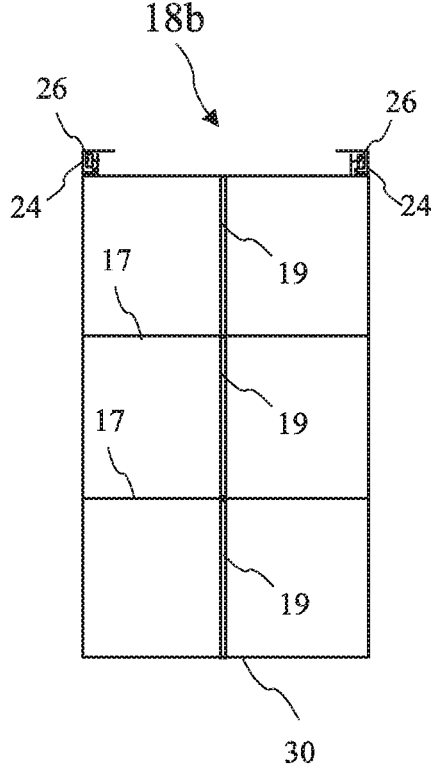
FIG. 7A
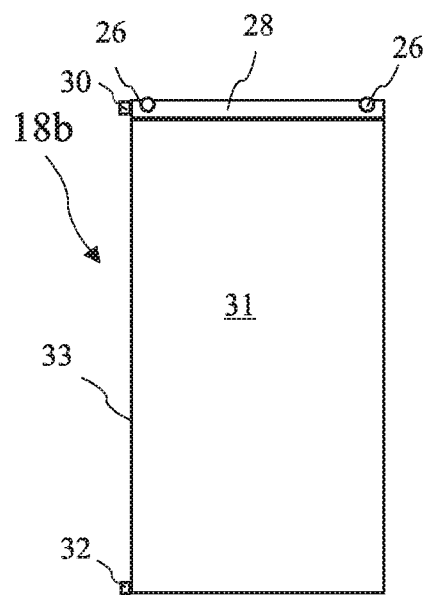
FIG. 7B

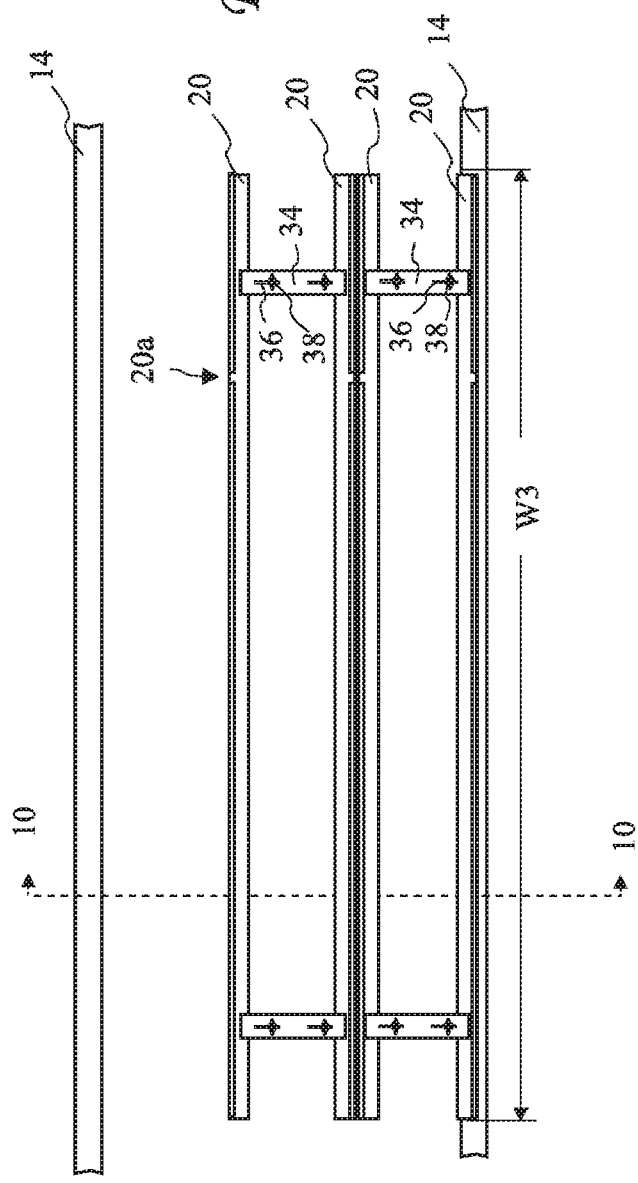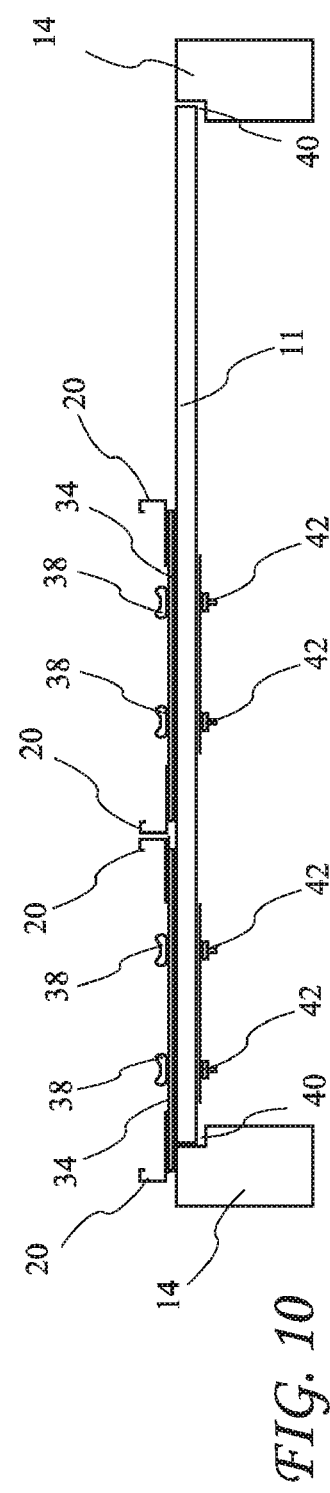

DOCUMENT STORAGE RACK CONVERSION APPARATUS

BACKGROUND OF THE INVENTION

The present invention relates to document storage and in particular to a system for converting bulk storage racks into an efficient file storage system.

It is often desirable, or even legally or contractually required, to store items such as documents, equipment, articles, and the like which may be required in the future. Long term storage facilities are available for storing such items and generally include vast arrays of storage racks, often to great heights. An example of a known document box storage rack 10 is shown in FIG. 1, with shelves absent to provide a clear view. The rack 10 includes vertical supports 12, lateral supports 14, and longitudinal supports 16. Generally, the shelves in such racking are designed for general storage and are of a size and spaces apart vertically to allow various size boxes to be stacked vertically, laterally, and longitudinally on the shelves. While such shelving provides a versatile storage capacity, it is inefficient for storage of common paper files which fit into a small known number of volumes. Storing paper files in boxes stacked on the shelves also results in difficulty in recovering papers which may be in boxes stacked behind and under other boxes.

BRIEF SUMMARY OF THE INVENTION

The present invention addresses the above and other needs by providing a rack conversion system which mounts to an existing storage rack and includes lateral tracks for side to side movement of forward bins and longitudinal tracks for front to rear movement of rear bins. The bins are sized to efficiently store a particular item, for example, paper files. The forward bins are movable side to side along the lateral tracks and reside in front of the rear bin. The rear bins are moveable front to rear along the longitudinal tracks and are normally positioned to the rear to allow the side to side movement of the forward bins. The lateral tracks are preferably mounted below the forward bins and do not interfere with the movement of the rear bins, and the longitudinal tracks are preferably mounted above the rear bins and do not interfere with movement of the forward bins. The rack conversion according to the present invention thus allows conversion of known storage racks to efficiently store and retrieve stored material thereby substantially improving known storage systems by as much as 67 percent by allowing easy and direct access to any box in up to three rows of boxes versus a single row of boxes.

In accordance with one aspect of the invention, there is provided a rack system including a storage rack frame, longitudinal supports, lateral tracks, and three lateral rows of bins. The storage rack frame includes at least four spaced apart uprights, each residing approximately vertically and forming a rectangle, and at least two pairs of lateral beams longitudinally spaced apart and approximately parallel. The pairs of lateral beams are supported by the uprights and reside in an approximately horizontal plane and each lateral beam has a groove in an upper inside edge. Decks normally used for storing material are supported by the shoulders in the lateral beams and four longitudinally spaced apart lateral tracks are mounted above each deck to carry two rows of laterally sliding forward bins. A multiplicity of pairs of longitudinal supports are carried under the lateral beams and each pair of longitudinal supports carries a rear bin. The bins have a bin width W and include two rows of the number N minus one of the forward bins and one row of the number N of the rear bins. The bins preferably have a depth of approximately the height of letter size paper folders. The positions of the lateral tracks are preferably longitudinally adjustable to allow room for letter or legal size folders. The forward bins slidably cooperate above respective lateral tracks to allow lateral movement of the forward bins within each of their respective rows and the row of rear bins normally resides behind the two rows of forward bins. The total width of the rows of forward bins, the number N, and the widths of the individual forward bins are selected to allow access to the rear bins by laterally sliding adjacent forward bins apart. Additionally, the longitudinal supports may be longitudinal tracks allowing the rear bins to move forward and rearward between separated adjacent forward bins.

In accordance with another embodiment of the invention, there is provided a rack system with the lateral tracks above the respective forward bins and longitudinal tracks below the respective rear bins.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 5A is a front view of one of the forward bins.

FIG. 5B is a side view of one of the forward bins carried on the lateral tracks.

FIG. 5C is a top view of one of the forward bins.

FIG. 6 is an end view of one of the lateral tracks having a "C" shaped profile to prevent tipping.

FIG. 7A is a front view of one of the rear bins carried on the longitudinal tracks.

FIG. 7B is a side view of one of the rear bins.

FIG. 7C is a bottom view of one of the rear bins.

FIG. 8 is an end view of one of the longitudinal tracks.

FIG. 9 is a top view of the lateral tracks and lateral beams.

FIG. 10 is an end view of the lateral tracks attached to the deck supported by the lateral beams.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1A:
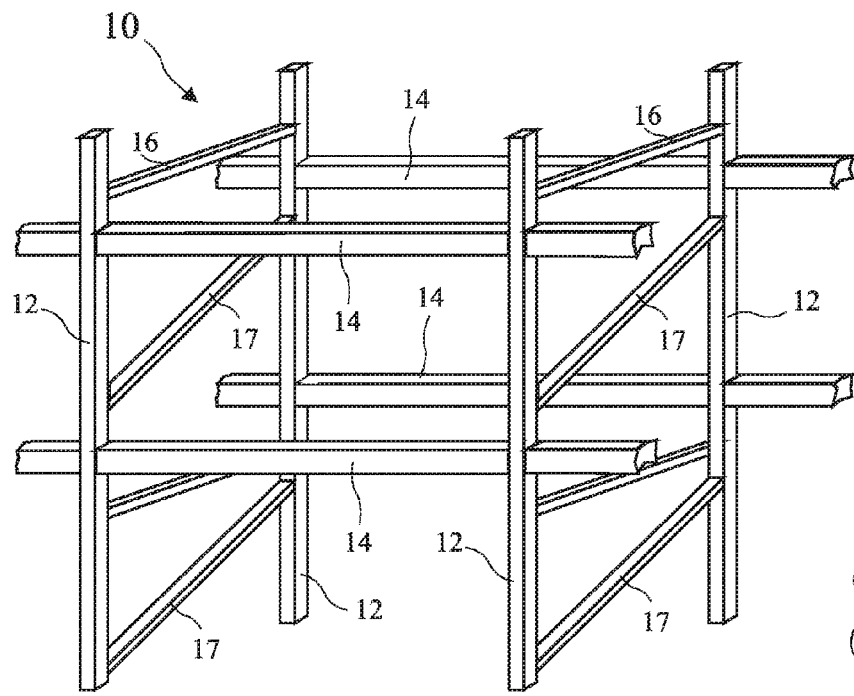
FIG. 1A is a bare prior art storage rack.

The present invention comprises apparatus for converting existing storage racks into an efficient file storage system. An example of a known storage rack 10 is shown in FIG. 1A, with decks absent to provide a clear view of uprights 12, lateral beams 14, longitudinal braces 16, and diagonal braces 17. The uprights 12 comprise at least four uprights and are approximately vertical and form a rectangle. A storage rack system 10 may be extended and include a large number of uprights 12 to fill a large warehouse. The lateral beams 14 are longitudinally spaced apart pairs, approximately parallel, and supported by the uprights defining an approximately horizontal plane (i.e., at the same height). The lateral beams 14 are generally the load bearing element of the rack system 10, and the longitudinal braces 16 and diagonal braces 17 hold the uprights 12 in the vertical position.

Figure 1B:
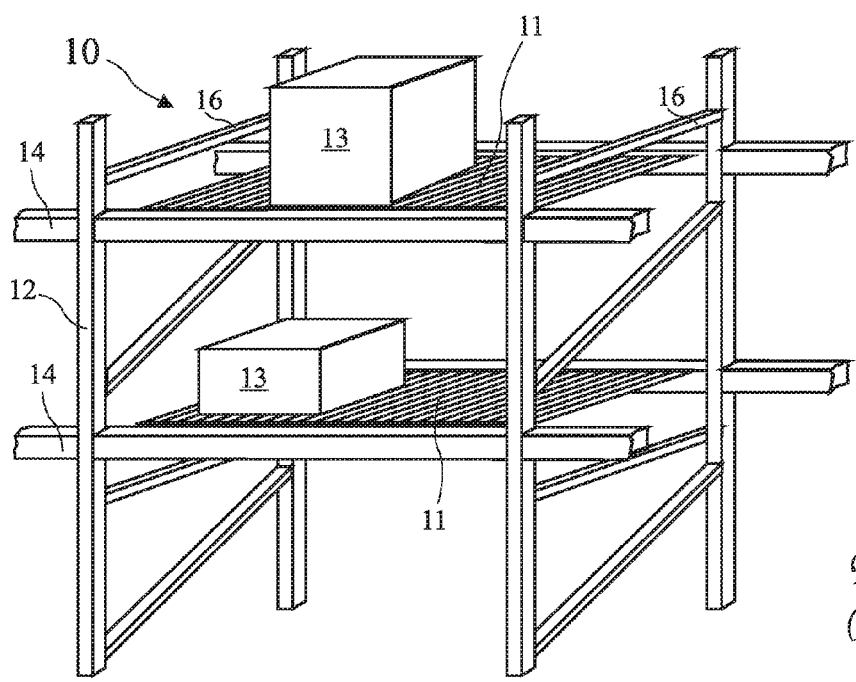
FIG. 1B is the prior art storage rack with decks and boxes stored on the decks.

The prior art storage rack 10 with decks 11, and boxes 13 stored on the decks 11, is shown in FIG. 1B. The lateral beams 14 include stepped shoulders 40 (see FIG. 10) on inside upper edges of the beams 14 to support the decks 11. Such stepped shoulders 40 are common on known beams 14 used with rack systems and are provided to position and support the decks 11, perforated decks, and the like, commonly used with rack systems 10. Unfortunately, the prior art storage rack 10 often results in inefficient use of space and/or difficulty in accessing boxes which have been pushed to the rear.

Figure 2:
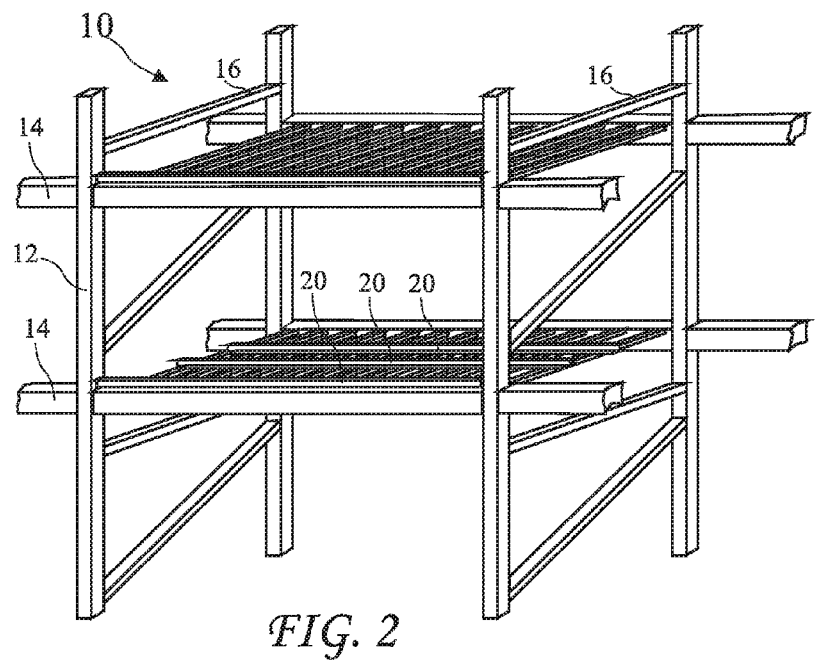
FIG. 2 is a storage rack with lateral tracks according to the present invention carried by decks supported by lateral beams.

A storage rack 10 with lateral tracks 20 according to the present invention, supported by decks 11 (see FIG. 1B), is shown in FIG. 2. The present invention advantageously uses the existing decks 11 to avoid major modifications to the storage rack 10. The lateral tracks 20 preferably comprise two pairs of lateral tracks 20 for carrying two rows of laterally sliding forward bins 18a (see FIG. 3) above the lateral tracks 20.

Figure 3:
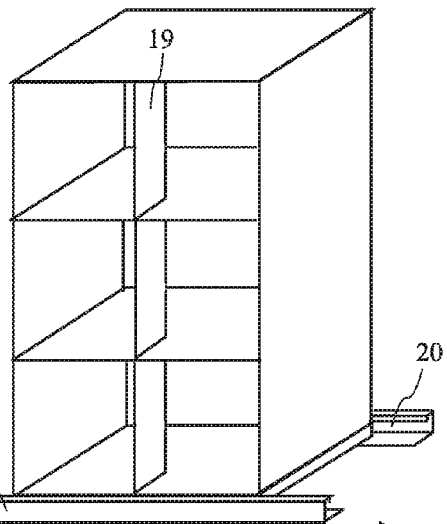
FIG. 3 is a perspective view of a forward bin according to the present invention, configured to slidably cooperate with the lateral tracks.

FIG. 3 is a perspective view of the forward bin 18a according to the present invention configured to slidably cooperate with lateral tracks 20. The lateral tracks 20 are shown below the bin 18a, but may also be above the bin 18a. The bin 18a may includes the internal struts 19 for additional strength.

Figure 4:
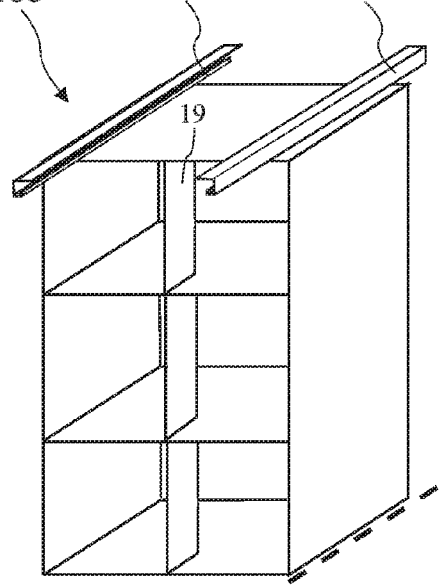
FIG. 4 is a perspective view of a rear bin according to the present invention, configured to slidably cooperate with longitudinal tracks.

A perspective view of a rear bin 18b according to the present invention, configured to slidably cooperate with longitudinal tracks 24 (see FIGS. 6 and 7A), is shown in FIG. 4. The longitudinal tracks 24 are shown above the bin 18b, but may also be below the bin 18b. The bin 18a may includes internal struts 19 for additional strength.

A front view of the forward bin 18a is shown in FIG. 5A, a side view of the forward bin 18a is shown in FIG. 5B, and a top view of the forward bin 18a is shown in FIG. 5C. The bin 18a preferably includes 2 shelves 17 dividing the bin 18a into three vertical storage spaces. The three storage spaces have heights H1, H2, and H3 which are all preferably approximately ten inches. The overall height H4 of the bin 18a is preferably approximately 30 inches. The width W1 of the bin 18a is preferably approximately 16 inches and the depth D of the bin 18a is preferably approximately 11 inches. Four rollers (or wheels) 22 are attached to front and rear bottom corners of the bin 18a to carry the bin 18a on the lateral tracks 20. An end view of the lateral track 20 supporting the bins 18a is seen in FIG. 5B, and a detailed end view of the lateral track 20 alone is shown in FIG. 6. Bumpers 23 reside on bottom corners of opposing sides 21 of the bins 18a to prevent direct metal to metal contact of adjacent bins 18a.

A front view of the rear bin 18b is shown in FIG. 7A, a side view of the rear bin 18b is shown in FIG. 7B, and a top view of the rear bin 18b is shown in FIG. 7C. The bin 18b preferably includes 2 shelves 17 dividing the bin 18b into three vertical storage spaces. The rear bin 18b has a depth D2 of preferably 11 inches to accept letter or legal size folders, and a width W2 which is preferably approximately the same width as the forward bins 18a. The heights of the rear bin 18a are preferably the same as the forward bin 18a. The rear bins 18b are preferably slidably supported by the longitudinal tracks 24 as shown in FIG. 7A. Rollers (or wheels) 26 are attached to rails 28 mounted to the top 30 of the rear bin 18b. The rails 28 preferably extend to the fronts 33 of the bin 18b and bumpers 30 are attached to forward ends of the rails 28 to prevent or reduce damage to the bin 18b from forward impact, for example, with a lateral beam 14. Rounded or angled guides 32 are preferably attached to bottom corners of the front 33 of the of the bin 18b to facilitate the bin 18b sliding between separated adjacent pairs of the forward bins 18a. The guides 32 are positioned and shaped to urge the forward bins further apart to allow the rear bin 18b to slide between the forward bins. A detailed end view of one of the longitudinal tracks 24 is shown in FIG. 8.

In another embodiment the rear bins 18b are stationary and are fixedly attached to the longitudinal supports replacing the longitudinal tracks 24.

A top view of the lateral tracks 20 and mounting apparatus comprising mounting plates 34, adjusting slots 36, and fasteners 38 according to the present invention, and the lateral beams 14, are shown in FIG. 9, and an end view of the lateral tracks 20 are shown in FIG. 10. The tracks 20 are attached to the mounting plates 34. Each mounting plate 34 has a pair of adjusting slots 36. The fasteners 38 pass through the adjusting slots 36, through the deck 11, and connect to backing apparatus 42 under the deck 11 to sandwich the deck 11 thereby fixing the position of the lateral tracks 20. The backing apparatus 42 may be nuts, washers and nuts, plates with threaded holes, plates with nuts attached, or any other apparatus allowing the deck 11 to be sandwiched to fix the position of the lateral tracks 20. The lateral tracks 20 also include disassembly notches 20a allowing the front bins 18a to be removed from the tracks.

The slots 36 are provided to allow pairs of the lateral tracks 20 to be moved longitudinally to adjust for storage of letter or legal size material. For example, to move a first pair of lateral tracks back approximately three inches and to move a second pair of lateral tracks behind the first pair of lateral tracks back approximately six inches, thereby providing a space for legal size material to extend out the fronts of both rows of the forward bins. Either or both pairs of the lateral tracks may be moved to allow appropriate storage. The default depths and positions of the forward bins 18a is for letter size material to minimize the reach to the rear bins 18b.

The pairs of lateral tracks 20 are advantageously supported by the existing decks 11 residing in the existing stepped shoulders 40 in the lateral beams 14, and thus may be easily used to modify existing storage racks 10 (see FIGS. 1A and 1B).

Figure 11A:
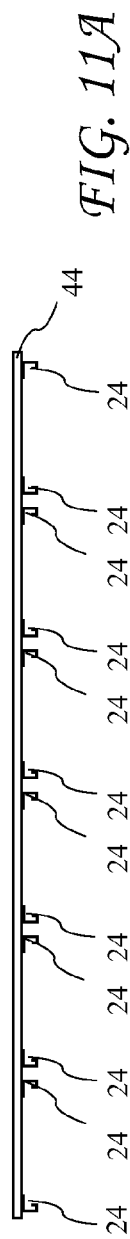
FIG. 11A is a front view of the longitudinal tracks attached to a longitudinal track assembly.
Figure 11B:
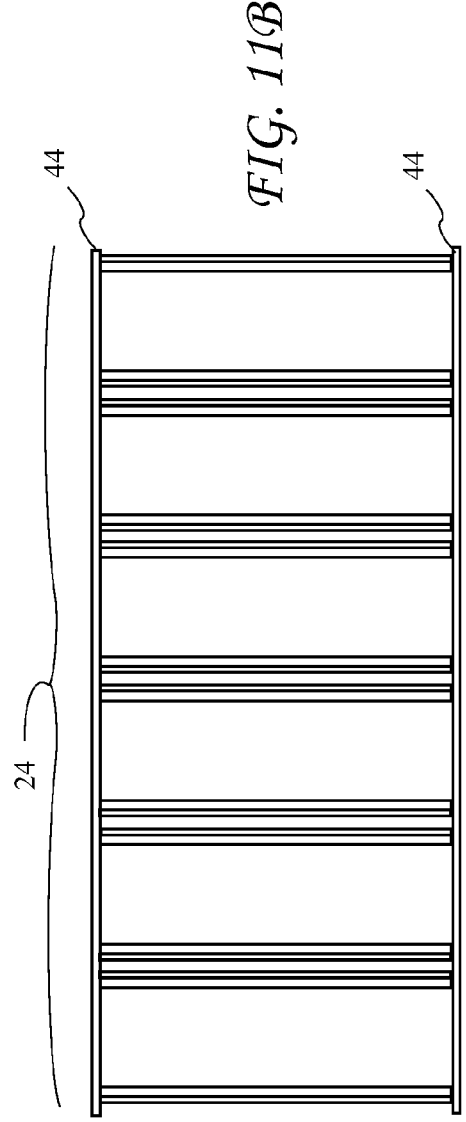
FIG. 11B is a top view of the longitudinal tracks attached to the longitudinal track assembly.
Figure 11C:
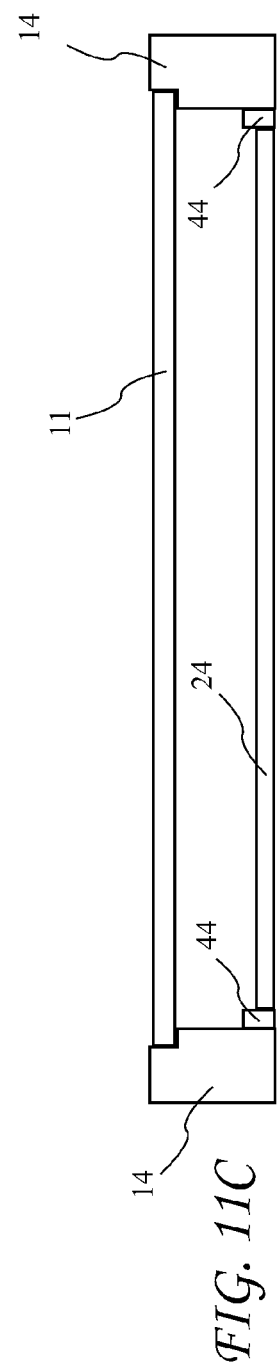
FIG. 11C is an end view of the longitudinal tracks attached to the longitudinal track assembly attached between a pair of lateral beams.

A front view of the longitudinal tracks 24 attached to a longitudinal track assembly are shown in FIG. 11A, a top view of the longitudinal tracks 24 attached to the longitudinal track assembly are shown in FIG. 11B, and an end view of the longitudinal tracks 24 attached to the longitudinal track assembly attached between a pair of lateral beams 14 are shown in FIG. 11C. The longitudinal tracks 24 are attached between bars 44 and the bars 44 are attached to lower inside edges of the lateral beams 14. While longitudinally moving rear bins 18b are preferred, an embodiment with stationary rear bins 18b provides advantages over known storage racks, and such stationary embodiment may simply include the rear bins 18b bolted to the decks 11 behind the forward bins 18a.

Figure 12A:
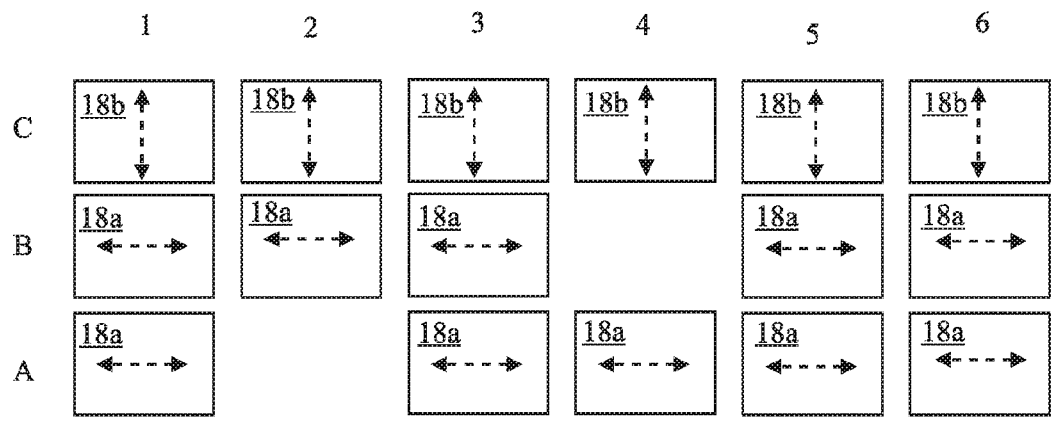
FIG. 12A is a top view of a possible orientation of the forward and rear bins according to the present invention.
Figure 12B:
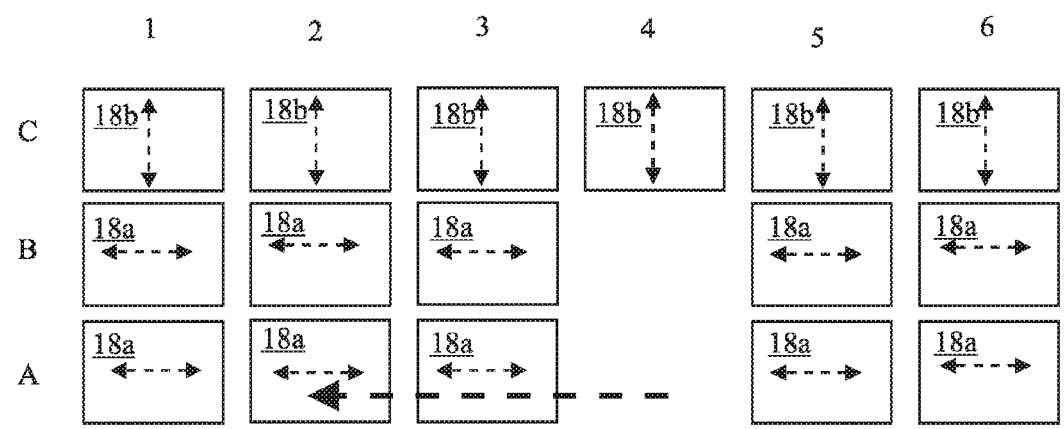
FIG. 12B shows a top view of the forward and rear bins with forward bins in a first row moved to provide access to a rear bin.
Figure 12C:
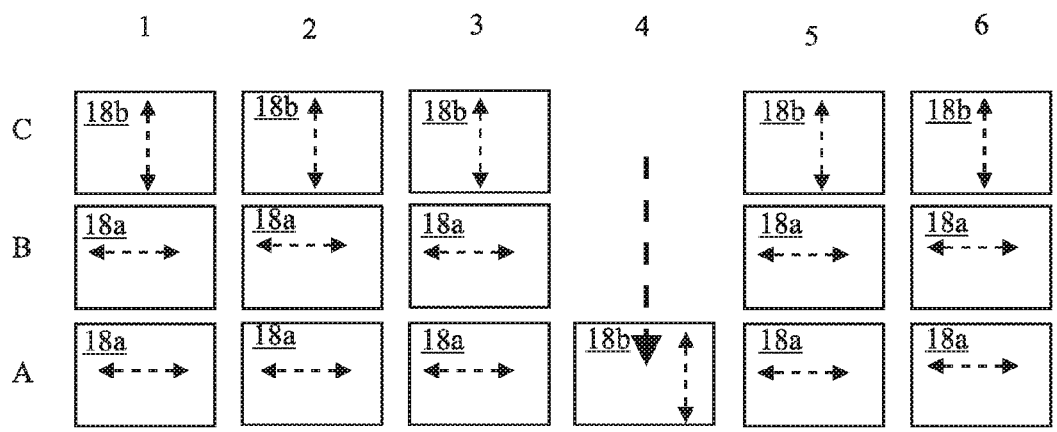
FIG. 12C shows the rear bin moved forward for better access.

A top view of a possible orientation of the forward bins 18a and rear bins 18b according to the present invention is shown in FIG. 12A, a top view of the forward bins 18a and rear bins 18b with forward bins 18a in a first row A moved to provide access to one of the rear bins 18b is shown in FIG. 12B, and the rear bin 18b is shown moved forward for better access in FIG. 12C.

Figure 13:
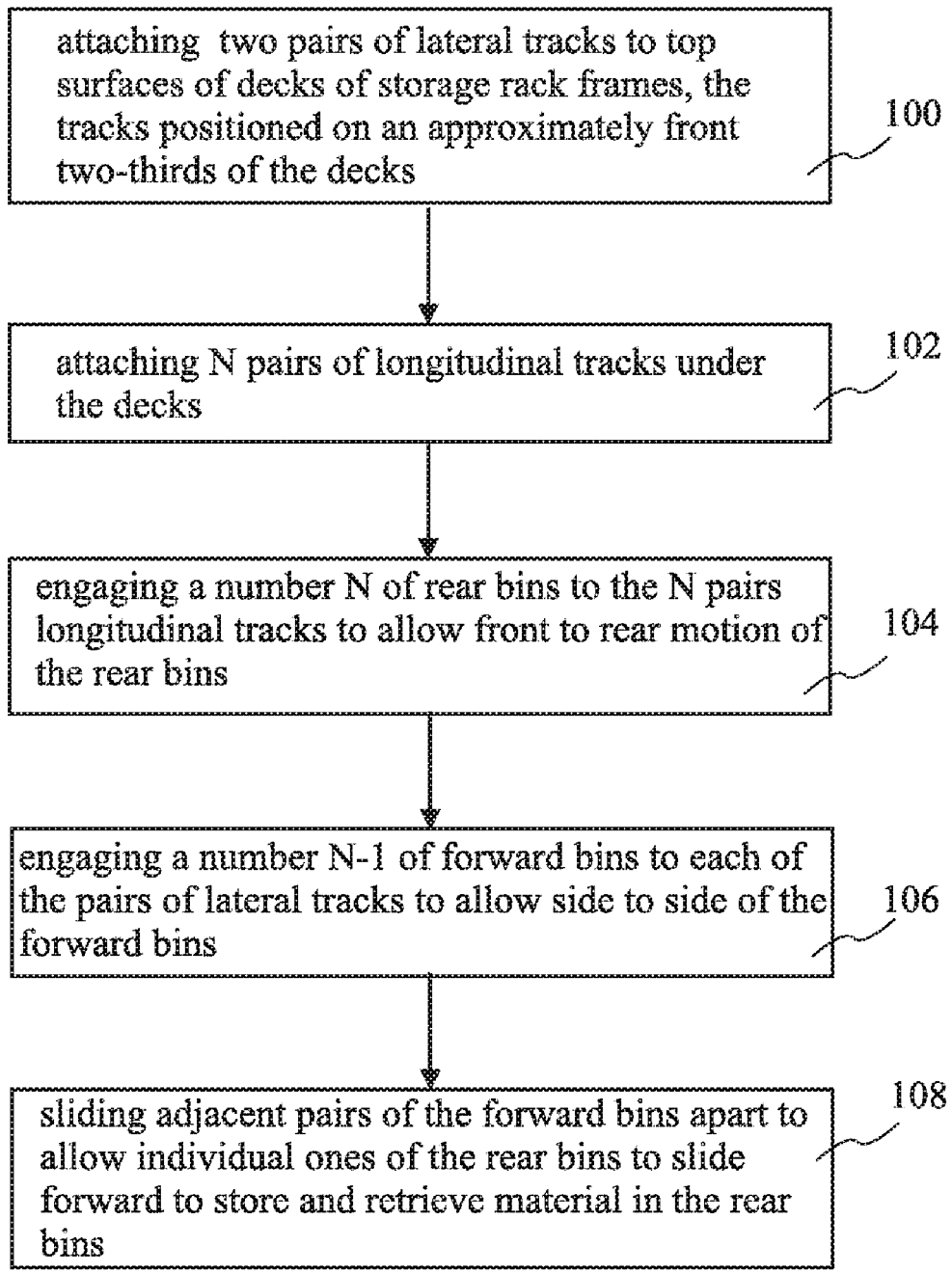
FIG. 13 is a method for converting know storage racks according to the present invention.

A method for converting know storage racks according to the present invention is described in FIG. 13. The method includes the steps of attaching two pairs of lateral tracks to top surfaces of decks of storage rack frames, the tracks positioned on an approximately front two-thirds of the decks at step 100, attaching N pairs of longitudinal tracks under the decks at step 102, engaging a number N of rear bins to the N pairs longitudinal tracks to allow front to rear motion of the rear bins at step 104, engaging a number N−1 of forward bins to each of the pairs of lateral tracks to allow side to side of the forward bins at step 106, and sliding adjacent pairs of the forward bins apart to allow individual ones of the rear bins to slide forward to store and retrieve material in the rear bins at step 108.

The bins have been depicted herein as formed of solid sheet metal. In some applications a requirement exists to use a perforated material to allow water to pass through the bins as a fire control requirement. Also, the bins may alternatively be constructed from metal, preferable steel rod. Such steel rod construction meets the fire control requirements and may reduce weights and cost. The steel rod bins may also be constructed to fold into a compact unit for shipping and thereby reduce shipping costs.

While the invention herein disclosed has been described by means of specific embodiments and applications thereof, numerous modifications and variations could be made thereto by those skilled in the art without departing from the scope of the invention set forth in the claims.

We claim:

1. A rack system comprising:
a storage rack frame comprising:
at least four spaced apart uprights, each residing approximately vertically and forming a rectangle; and
at least two pairs of lateral beams longitudinally spaced apart and approximately parallel, the at least two pair of lateral beams supported by the uprights and defining an approximately horizontal plane;
lateral tracks supported by the lateral beams;
at least two rows of bins comprising:
at least one row of forward bins slidably cooperating with the lateral tracks to allow lateral movement of the forward bins within each of their respective rows; and
a row of rear bins residing behind the at least one row of forward bins and supported by the lateral beams, wherein the sum of the widths W1 of the forward bins in each of the at least one row and the widths W1 of the individual forward bins are selected to allow access to the rear bins by laterally sliding adjacent forward bins apart, and wherein the rear bins slidably cooperate with longitudinal tracks to slide the rear bins forwards and rearwards in a direction orthogonal to the lateral movement of the forward bins.

2. The rack system of claim 1, wherein:
each lateral beam of the at least one pair of lateral beams includes a stepped shoulder on an inside upper edge; and
the lateral tracks are supported by decks resting on the stepped shoulders between the at least one pair of lateral beams.

3. The rack system of claim 2, wherein:
mounting plates are attached to top surfaces of the decks; and
the lateral tracks are attached to the mounting plates.

4. The rack system of claim 3, wherein:
the mounting plates include adjusting slots; and
the adjusting slots allow the lateral tracks to be adjusted longitudinally to adjust the positions of the forward bins forwards and backwards on the decks.

5. The rack system of claim 4, wherein the at least one row of forward bins comprises two rows of forward bins.

6. The rack system of claim 1, wherein:
each forward bin has a bin width W1;
each row of forward bins has a maximum width Wr;
the at least one row of forward bins comprises at least one row of a number N minus one of the forward bins, the bin width W1, the row width Wr, and the number N selected so that a lateral gap of at least approximately the bin width W1 may be created between any two adjacent of the forward bins by sliding the adjacent forward bins laterally to separate the two adjacent of the forward bins to allow one of the rear bins to slide forward into the lateral gap between the laterally separated adjacent forward bins.

7. The rack system of claim 6, wherein the rear bins comprise the number N rear bins.

8. The rack system of claim 7, wherein the rear bins have a width of approximately the bin width W.

9. The rack system of claim 8, wherein:
the bin width W is approximately 16 inches; and
the number N is six.

10. A rack system comprising:
a storage rack frame comprising:
at least four spaced apart uprights, each residing approximately vertically and forming a rectangle;
at least two pairs of lateral beams longitudinally spaced apart and approximately parallel, the at least two pairs of lateral beams supported by the uprights and defining approximately horizontal planes; and
stepped shoulders on an inside upper edge of each lateral beam;
four lateral tracks supported by the stepped shoulders of the lateral beams;
three lateral rows of bins comprising:
two rows of each a number N minus one of forward bins laterally slidably cooperating above the four lateral tracks to allow lateral movement of the forward bins within each of their two respective rows; and
a row of the number N of the rear bins residing behind the two rows of forward bins, wherein the rear bins have approximately the same width as the forward bins, wherein the rear bins slidably cooperate with longitudinal tracks to slide the rear bins forwards and rearwards in a direction orthogonal to the lateral movement of the forward bins.

11. The rack system of claim 10, wherein:
the rear bins slidably cooperate with longitudinal tracks; and the cooperation of the rear bins with the longitudinal tracks, and the space provided by sliding adjacent forward bins apart, allow forward and rearward movement of the rear bins between the forward bins.

12. A rack system comprising:
a storage rack frame comprising:
  at least four spaced apart uprights, each residing approximately vertically and forming a rectangle;
  at least two pairs of lateral beams longitudinally spaced apart and approximately parallel, the pairs of lateral beams supported by the uprights and defining an approximately horizontal plane;
  stepped shoulders on an inside upper edge of each lateral beam; and
  decks supported by the stepped shoulders;
twice a number N of longitudinal tracks carried by the lateral beams;
four lateral tracks supported by the decks;
three lateral rows of bins, each bin having an approximate bin width W and comprising:
  two rows, each row having the number N minus one, of forward bins slidably cooperating above the four lateral tracks to allow lateral movement of the forward bins within each of their respective rows; and
  a row of the number N of the rear bins residing behind the two rows of forward bins and longitudinally slidably carried by the longitudinal tracks, wherein the number and the widths of the bins is selected to allow the rear bins to slide forward through a space provided by laterally sliding adjacent forward bins apart.

13. The rack system of claim 12, wherein the rear bins are longitudinally slidable to slide forward on the longitudinal tracks to approximately align with a front most row of forward bins.

14. The rack system of claim 13, wherein the lateral tracks are perpendicular to the longitudinal tracks and the motion of the rear bins is orthogonal to the motion of the forward bins.

15. The rack system of claim 14, wherein the forward bins are carried above the lateral tracks and the rear bins are carried below the longitudinal tracks.

16. The rack system of claim 1, wherein:
  the forward bins slidably cooperate with the lateral tracks below the forward bins; and
  the rear bins slidably cooperate with the longitudinal tracks above the rear bins to slide the rear bins forward between the spread apart adjacent forward bins.

17. The rack system of claim 4, wherein the longitudinal tracks are attached to bottom surfaces of the decks to carry the rear bins forward and rearward in motion orthogonal to the lateral motion of the forward bins.

* * * * *